(12) United States Patent
March Nomen et al.

(10) Patent No.: US 11,506,181 B2
(45) Date of Patent: Nov. 22, 2022

(54) SMART WIND TURBINE BLADE WITH ACTIVE COMPONENTS COMPRISING A LIGHTNING PROTECTION SYSTEM

(71) Applicant: Siemens Gamesa Renewable Energy Innovation & Technology S.L., Sarriguren (ES)

(72) Inventors: Victor March Nomen, Les Fonts (ES); Joan Montanyá Puig, Castellnou de Bages (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 252 days.

(21) Appl. No.: 17/013,914

(22) Filed: Sep. 8, 2020

(65) Prior Publication Data
US 2021/0079894 A1    Mar. 18, 2021

(51) Int. Cl.
*F03D 80/30*    (2016.01)
*F03D 9/25*    (2016.01)
(Continued)

(52) U.S. Cl.
CPC .............. *F03D 80/30* (2016.05); *F03D 9/25* (2016.05); *F03D 80/82* (2016.05); *F03D 80/88* (2016.05); *F03D 1/0675* (2013.01)

(58) Field of Classification Search
CPC .......... F03D 1/0675; F03D 9/25; F03D 80/30; F03D 80/40; F03D 80/82; F03D 80/85; F03D 80/88
See application file for complete search history.

(56) References Cited

U.S. PATENT DOCUMENTS 6,612,810 B1 *  9/2003  Olsen ..................... F03D 80/40
                                                           415/908
8,456,790 B2 *  6/2013  Tanaka ................... F03D 80/30
                                                           361/111
(Continued)

FOREIGN PATENT DOCUMENTS

DE          19748716 C1    11/1998
EP           2522852 A1    11/2012
(Continued)

OTHER PUBLICATIONS

Indian Office Action dated Apr. 22, 2021 for Application No. 202034029855.

(Continued)

*Primary Examiner* — Courtney D Heinle
*Assistant Examiner* — Sang K Kim
(74) *Attorney, Agent, or Firm* — Schmeiser, Olsen & Watts LLP

(57) ABSTRACT

A smart wind turbine blade and lightning protection system for smart wind turbine blades thereof is provided. More in particular, it relates to a smart wind turbine blade including a lightning protection system including active components such as the type for de-icing systems, sensors and/or flaps among others wherein the path of the lightning current is guided to avoid the hub preventing currents to flow through the bearings which may causes significant damage to them and also to the metallic cabinet from where active components are electrically fed.

9 Claims, 3 Drawing Sheets

Figure 1:
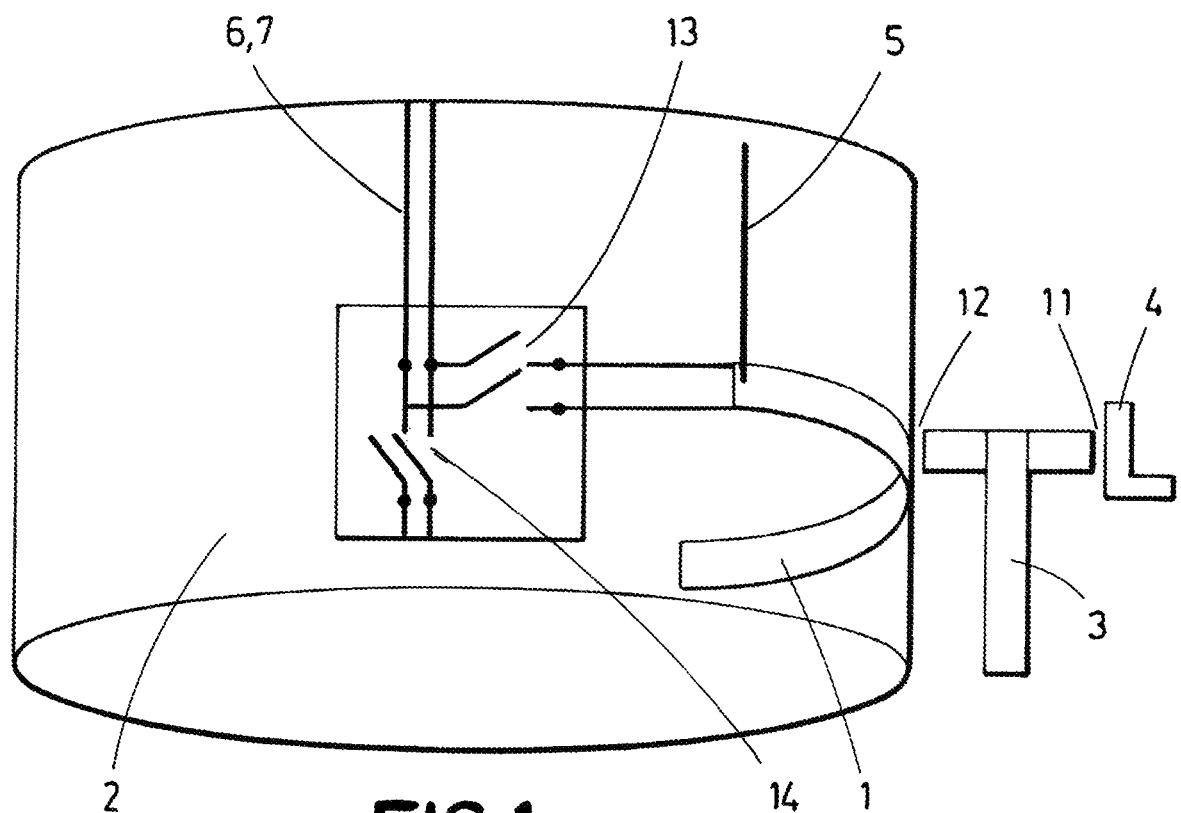

(51) Int. Cl.
 *F03D 80/80* (2016.01)
 *F03D 1/06* (2006.01)

(56) References Cited

U.S. PATENT DOCUMENTS

| | | | |
|---|---|---|---|
| 9,157,419 B2 | 10/2015 | Lewke | |
| 9,797,381 B2* | 10/2017 | Iriarte Eleta | F03D 80/40 |
| 10,030,634 B2* | 7/2018 | Tanaka | F03D 80/60 |
| 10,927,821 B2* | 2/2021 | Badger | F03D 80/40 |
| 2010/0119370 A1* | 5/2010 | Myhr | F03D 80/40 |
| | | | 416/169 R |
| 2015/0098823 A1 | 4/2015 | Iriarte Eleta et al. | |
| 2015/0204311 A1 | 7/2015 | Clemens | |
| 2021/0231107 A1* | 7/2021 | March Nomen | F03D 80/30 |

FOREIGN PATENT DOCUMENTS

| | | |
|---|---|---|
| WO | WO 0079128 A1 | 12/2000 |
| WO | WO 2018095649 A1 | 5/2018 |

OTHER PUBLICATIONS

European Search Report dated Mar. 19, 2020 for Application No. 19380023.2.

\* cited by examiner

SMART WIND TURBINE BLADE WITH ACTIVE COMPONENTS COMPRISING A LIGHTNING PROTECTION SYSTEM

CROSS-REFERENCE TO RELATED APPLICATIONS

This application claims priority to European Application No. 19380023.2, having a filing date of Sep. 16, 2019, the entire contents of which are hereby incorporated by reference.

FIELD OF TECHNOLOGY

The following is included in the technical field of smart wind turbine blades and lightning protection systems for smart wind turbine blades thereof. More in particular, it relates to a smart wind turbine blade comprising a lightning protection system comprising active components—such as the type for de-icing systems, sensors and/or flaps among others—wherein the path of the lightning current is guided to avoid the hub preventing currents to flow through the bearings which may causes significant damage to them and also to the metallic cabinet from where active components are electrically fed.

BACKGROUND

Wind turbine blades with active components require the use of metallic wires to feed the active components inside the blade. This situation enhances the risk of lightning damages on those components, and these need to be integrated into the blade lightning protection system (LPS) or redesign said blade LPS. This applies to smart or active blades, of the type having—for example—anti-icing or de-icing systems or flaps among other smart blades configurations. This also applies for sensors installed inside the blades, such as thermocouples or any inductive or capacitive sensors for example.

Some lightning protection systems for protecting wind turbine blades with active components are known in the state of the art.

For example, document WO2000079128A1 discloses a wind turbine blade comprising a lightning receptor at the tip and an electric conductor connected to said lightning receptor and earthed at the blade rotor. Moreover, it further describes two conductors connected to the heating elements and wherein both conductors are connected and earthed through spark gaps at the blade root. In this type of configuration, as the impedance of the spark gaps respect to wind turbine grounding is higher than the impedance from the hub or pitch bearing to the wind turbine grounding, all lightning current will flow through the hub and nacelle frame across the bearings. This path can damage the main shaft bearing of the wind turbine.

Document US2015098823A1 describes a lightning protection system with an integrated anti-icing system for wind turbine blades of the type with various conductive sheets embedded in the laminates of the blade with electrodes and wherein the LPS comprises one receptor at the tip connected to a downlead cable grounded at the blade root and further comprising a voltage discharger installed between the electrodes connected to the conductive sheets and to the downlead cable. Likewise, in the solution disclosed in this document the lightning current is not guided from the blade to the nacelle, and lightning current will inevitably flow through the bearings, and main bearings causing damage.

In the solutions known by the applicant in the state of the art, the "ground" point is found to be out of the blade, this is in the hub, or else directly electrically connect the neutral or ground cable to the internal metallic part of the pitch bearing. With these solutions there is no chance for the lightning current to be guided through any lightning transmission system (LTS) from the blade to the nacelle bypassing bearings. For example, Gamesa WO2000079128A1 uses a spark gap system (known as hammer), and as the impedance of the hammer respect to wind turbine grounding is higher than the impedance from the hub or pitch bearing to the wind turbine grounding, all lightning current will flow through the hub and nacelle frame across the bearings. This path may damage main shaft bearing of the wind turbine.

SUMMARY

A smart wind turbine blade with active components, comprising a lightning protection system (LPS), is disclosed herein with which it has been found that at least the above disadvantages relating to the conventional art solutions are mitigated.

More in particular, according to a first aspect of embodiments of the invention, there is provided a smart wind turbine blade with active components, comprising a lightning protection system (LPS) comprising:
   a lightning band located at the blade root,
   a lightning transmission system (LTS) intended to be electrically linked by a first switch to a nacelle frame and electrically linked by a second switch to the lightning band,
   a lightning protection conductor electrically linked with the lightning band,
   power and/or signal cables to feed the active components thereof,
   a switching unit comprising:
      a third switch able to link at least one power and/or signal cable of the power and/or signal cables with the lightning transmission system, and
      a fourth switch able to link the power and/or signal cables with a hub frame,
wherein each switch is able to open or close links thereof and wherein the third switch and the fourth switch are configured to be controlled in a way that during lightning activity the fourth switch is opened and the third switch is closed, deactivating the active components, hence during a lightning hit, said lightning is guided to the nacelle frame bypassing bearings.

Optionally, the third switch of the switching unit is able to link the at least one power and/or signal cable of the power and/or signal cables with the lightning transmission system via the lightning protection conductor and/or the lightning band.

Optionally, the fourth switch of the switching unit is able to link the power and/or signal cables with the hub frame via metallic wires.

Consequently, the switching unit works according to the logic algorithm:
   when operation of the blade active components is desirable, during no lightning activity, fourth switch is closed and third switch is open, and
   when operation of the blade active components is not desirable, thus during potential lightning activity or atmospheric conditions, fourth switch is open and third switch is closed.

For example, this may be done by having an electric field mill in the area, or from data coming from lightning location systems or weather services.

This system based on switches, can select whether or not, that some or all power or signal cables of the active components are fed from the hub or connected to the LPS at the root, this is connected to the LPS conductor or lightning band.

The third and fourth switches could comprise air pressurized, vacuum or insulating gas/air, or any similar suited high voltage switches.

The first switch and the second switch of the lightning transmission system are electrically linked by a sliding contact to the nacelle frame—or gutter ring—and the lightning band.

Alternatively, the first switch and the second switch of the lightning transmission system could be spark gaps.

In all alternatives explained above, assure that 100% of the lightning current is guided to the nacelle frame bypassing main bearings.

This solution is also compatible by replacing the third switch by a spark gap, and this spark gap having or not a high ohmic resistor in parallel (with a resistance in the kΩ range). In that case V3 may be replaced by a BV3. This BV3 shall be coordinated as before explained.

Another alternative for the third switch sw3 is to install a surge protective device (SPD), for example a Zinc Oxide varistor. This device can act as an open switch under operation voltage and as a short-circuit when submitted to high voltage differences as occurs during a lightning event. So, the own non-linear nature of the surge protective device (SPD) allows the use of this component as a switch for this application.

The fourth switch comprise a transformer installed at the blade root.

In this case, the transformer is used to isolate the blade circuit from the primary circuit which feeds the blade from the wind turbine power supply usually at the hub. This solution allows the use of both systems simultaneously if "insulation coordination" is well addressed.

The lightning protection conductor comprises a down conductor cable used as a neutral cable for the active system, and said down conductor bypasses the third switch and is directly connected to the fourth switch.

In this alternative, the switch or spark gap between said replaced wire and the LPS down-conductor of the above explained alternatives is removed to have direct electrical contact between these and having the LPS down-conductor as neutral for the active system.

BRIEF DESCRIPTION

Figure 2:
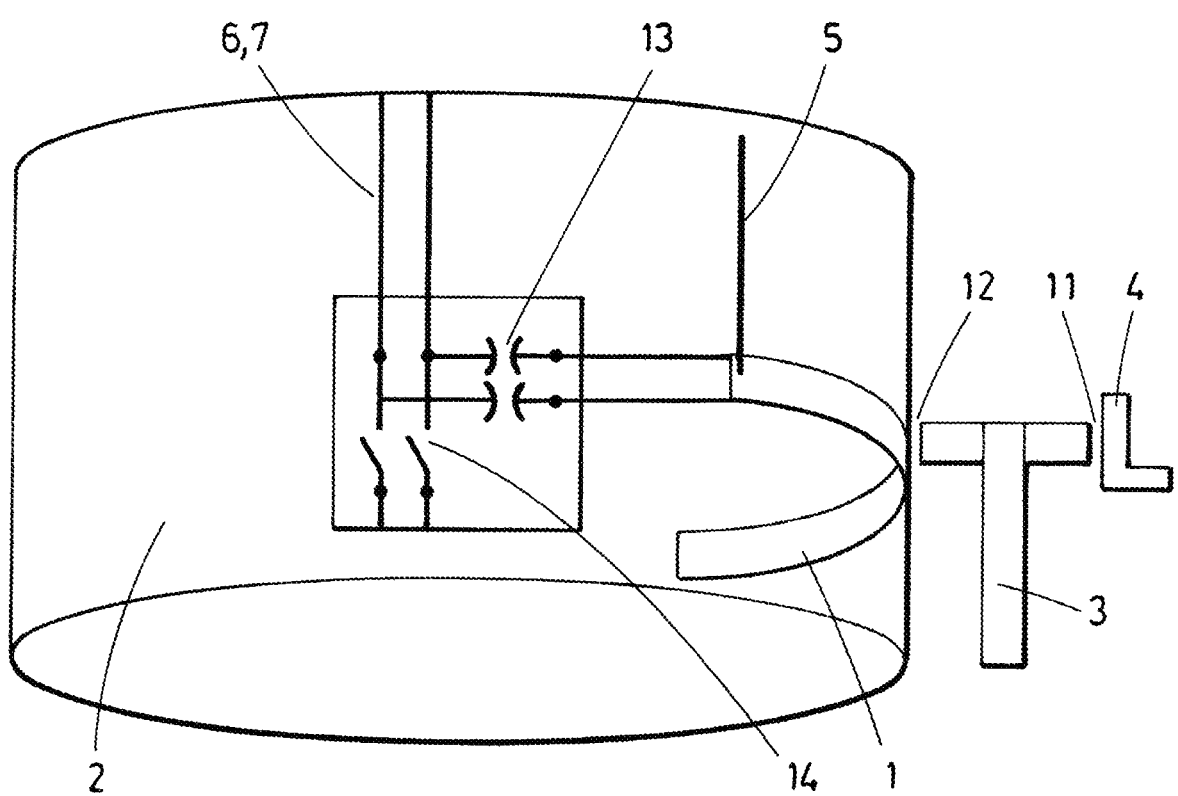
Figure 3:
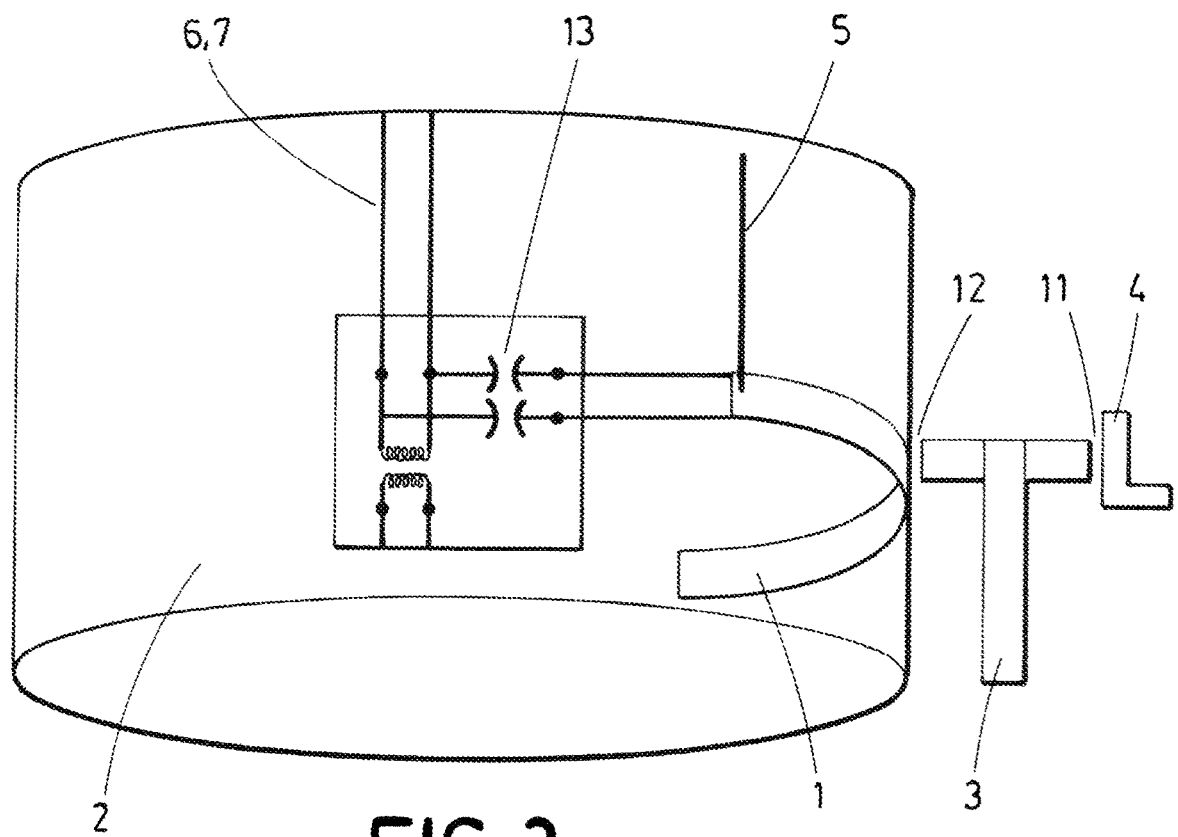
Figure 4:
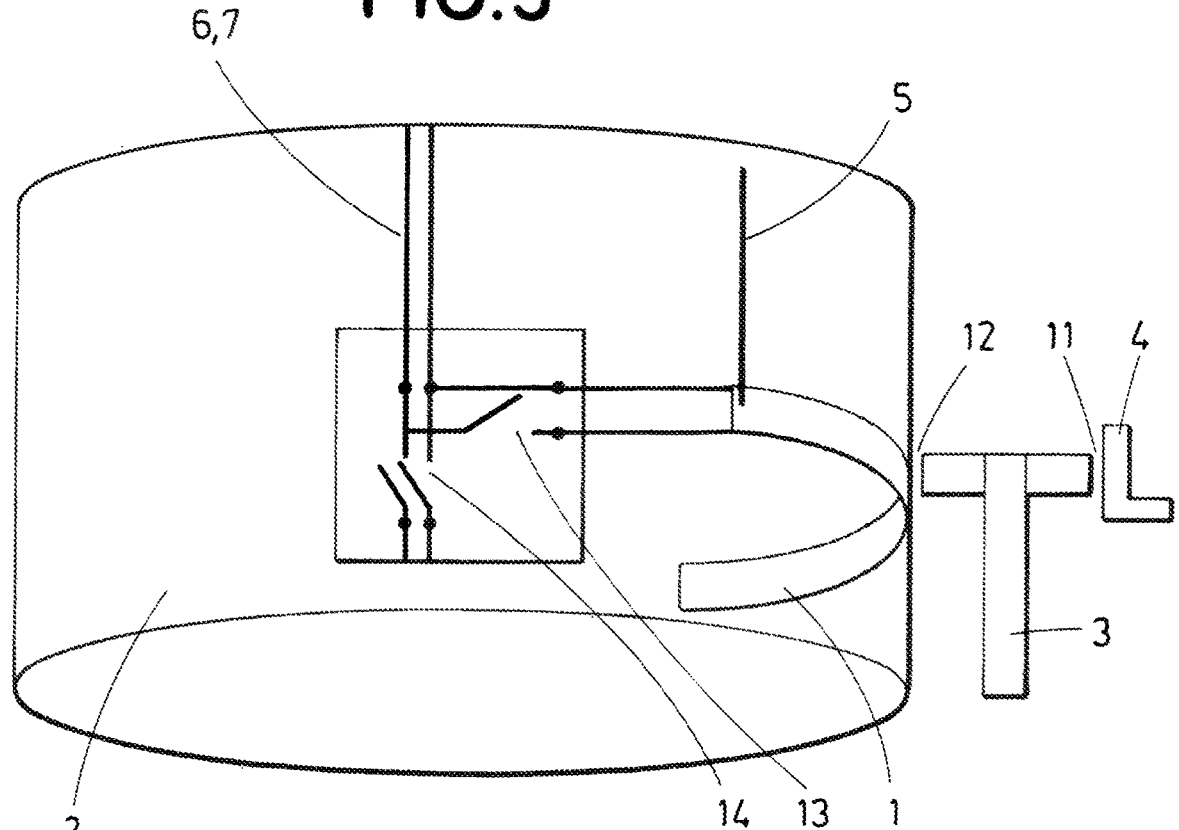
Figure 5:
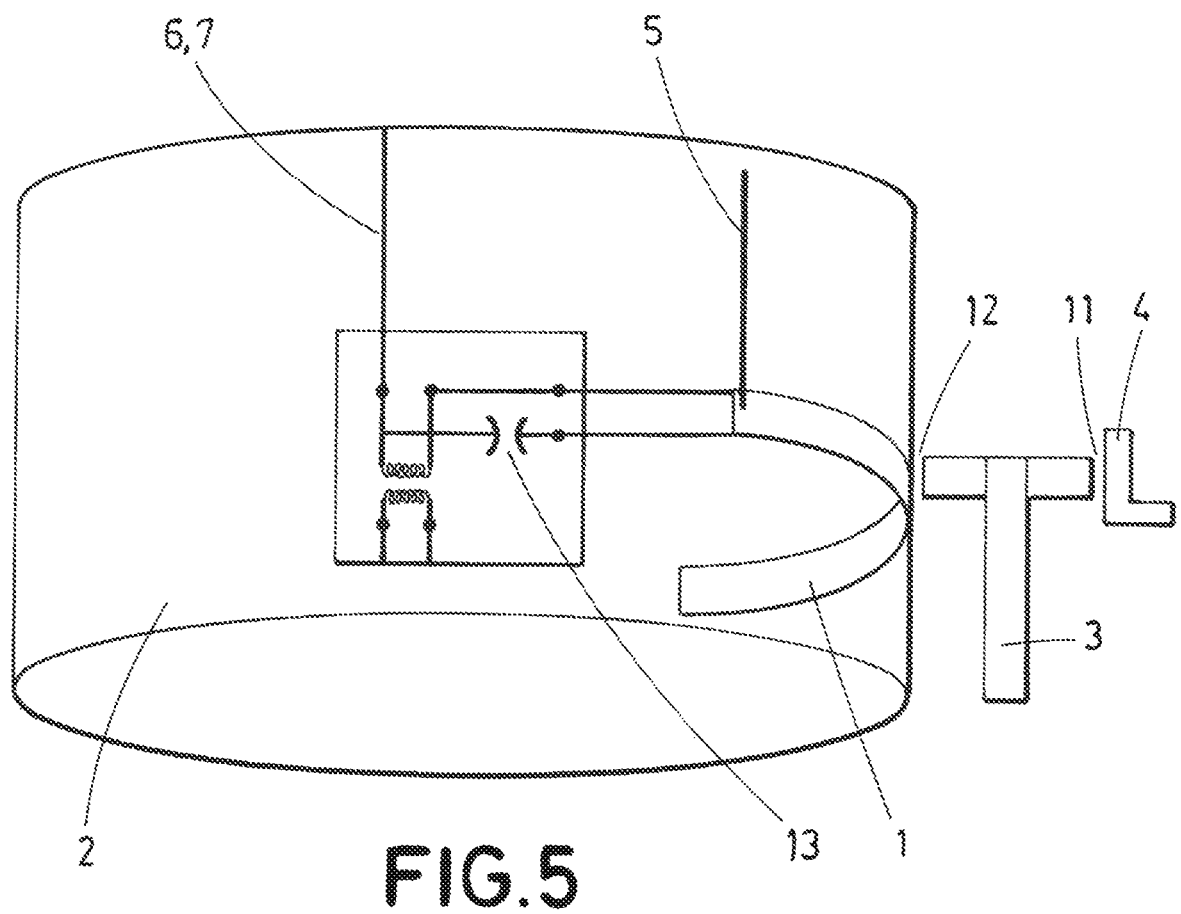

Some of the embodiments will be described in detail, with references to the following Figures, wherein like designations denote like members, wherein:

FIG. 1—illustrates a schematic view of the of the lightning protection system according to a first embodiment of the invention;

FIG. 2—illustrates a schematic view of the of the lightning protection system according to the first embodiment of the invention wherein the third switch is replaced by a spark gap;

FIG. 3—illustrates a schematic view of the lightning protection system according to a second embodiment of the invention, wherein the fourth switch comprises a transformer;

FIG. 4—illustrates a schematic view of the lightning protection system according to a third embodiment of the invention, wherein the LPS conductor is used as a neutral for the active system with regard to the configuration shown in the first preferred embodiment of the invention; and FIG. 5—illustrates a schematic view of the lightning protection system according to a third embodiment of the invention, wherein the LPS conductor is used as a neutral for the active system with regard to the configuration shown in the second embodiment of the invention.

DETAILED DESCRIPTION

The smart wind turbine blade with active components comprises a lightning protection system which in turn comprises:
- a lightning band (1) located at the blade root (2),
- a lightning transmission system (3) intended to be electrically linked by a first switch (11) to a nacelle frame (4) and electrically linked by a second switch (12) to the lightning band (1),
- a lightning protection conductor (5) electrically linked with the lightning band (1),
- power and/or signal cables (6, 7) to feed the active components thereof,
- a switching unit comprising:
  - a third switch (13) able to link at least one power and/or signal cable of the power and/or signal cables (6, 7) with the lightning transmission system (3), and
  - a fourth switch (14) able to link the power and/or signal cables (6, 7) with a hub frame (8), wherein each switch (11, 12, 13, 14) is able to open or close links thereof and wherein the third switch (13) and the fourth switch (14) are configured to be controlled in a way that during lightning activity the fourth switch (14) is opened and the third switch (13) is closed, deactivating the active components.

The third switch (13) of the switching unit is able to link the at least one power and/or signal cable of the power and/or signal cables (6, 7) with the lightning transmission system (3) via the lightning protection conductor (5) and/or the lightning band (1).

The fourth switch (14) of the switching unit is able to link the power and/or signal cables (6, 7) with the hub frame (8) via metallic wires (9, 10).

Consequently, the switching unit works according to the logic algorithm:
- when operation of the blade active components is desirable, during no lightning activity, the fourth switch (14) is closed and the third switch (13) is open, and
- when operation of the blade active components is not desirable, thus during potential lightning activity or atmospheric conditions, the fourth switch (14) is open and the third switch (13) is closed.

In a first preferred embodiment shown in FIG. 1, the lightning transmission system (3) is electrically linked by the first switch (11) and the second switch (12) being sliding contacts, to the nacelle frame (4)—or gutter ring—and the lightning band (1).

In this case the voltage difference V1 in the first switch (11) would be the impedance between the gutter ring—or nacelle frame (4)—and the part of the lightning transmission system (3) in sliding contact with the gutter ring.

Likewise, the voltage difference V2 of the second switch (12) would be the impedance between the lightning band (1) and the part of the lightning transmission system (3) in sliding contact with the lightning band (1).

The voltage difference V3 of the third switch (13) is related to the impedance of the third switch (13) when closed.

Thus, when the fourth switch (14) is open and the third switch (13) is closed, the breakdown voltage BV4 in the fourth switch (14), would be:

BV4>(V3+V2+V1), in case of the lightning transmission system (3) with two sliding contacts.

In this equation, the impedances of the connection wires are neglected, as their impedance is much lower compared with the switches (11, 12, 13, 14).

In this case, the fourth switch (14) would have a breakdown voltage BV4 for an electric arcing to be produced between the two terminals of the switch (14), for example a1-a2 or b1-b2 when open and a voltage difference V4 due to the contacts and wire when close. V4 is expected to be very low.

Likewise, the third switch (13) has a breakdown voltage BV3 for an electric arcing to be produced between the two terminals of the switch (13), for example a2-a3 or b2-b3, when open, and a voltage difference V2 due to the contacts and wire when close. V2 is expected to be very low.

Alternatively, the first switch (11) and the second switch (12) of the lightning transmission system could be spark gaps.

In this case, when the fourth switch (14) is open and the third switch (13) is closed, the breakdown voltage BV4 in the fourth switch (14), would then be:

BV4>(V3+BV2+BV1), in case of the lightning transmission system (3) with two spark gaps.

More in particular, the breakdown voltage BV1 of the first switch (11) would be the electric arcing to be produced between the gutter ring (or nacelle frame (4)) and the closest terminal of the lightning transmission system (3) to it.

In all alternatives explained above, assure that 100% of the lightning current is guided to the nacelle frame (4) bypassing main bearings.

This solution is also compatible by replacing the third switch (13) by a spark gap, as shown in FIG. 2, and this spark gap having or not a high ohmic resistor in parallel (with a resistance in the kΩ range). In that case V3 may be replaced by a BV3. This BV3 shall be coordinated as before explained.

Another alternative for the third switch (13) is to install a surge protective device (SPD), for example a Zinc Oxide varistor. This device can act as an open switch under operation voltage and as a short-circuit when submitted to high voltage differences as occurs during a lightning event. So, the own non-linear nature of the surge protective device (SPD) allows the use of this component as a switch for this application.

In a second preferred embodiment shown in FIG. 3, the fourth switch (14) comprises a transformer installed at the blade root (2).

In this case, the transformer is used to isolate the blade circuit from the primary circuit which feeds the blade from the wind turbine power supply usually at the hub. This solution allows the use of both systems simultaneously if "insulation coordination" is well addressed.

In this case, when lightning surge approaches the blade root (2), the event shall find the path with lowest impedance. So, it shall be assured:

BVt4>(BV3+BV2+BV1), in case of LTS with two spark gaps.
being BVt4 the breakdown voltage between the primary and secondary windings of the transformer, and BV3 the breakdown voltage for spark gap of the third switch (13), and BV2 and BV1 the breakdown voltages for spark gaps of the lightning transmission system (3).

Note that the third switch (13) may also be a switch which would only be opened when active system is turned on. And that the lightning transmission system (3) may comprise sliding contacts in one or both sides as described before.

In a third preferred embodiment shown in FIGS. 4 and 5, the lightning protection conductor (5) comprises a light protection down conductor cable used as a neutral cable for the active system, and said down conductor cable bypasses the third switch (13) and is directly connected to the fourth switch (14).

In this alternative, the switch or spark gap between said replaced wire and the light protection down conductor cable of the above explained alternatives is removed to have direct electrical contact between these and having the light protection down conductor cable as neutral for the active system.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A smart wind turbine blade with active components, comprising a lightning protection system comprising:
    a lightning band located at the blade root;
    a lightning transmission system intended to be electrically linked by a first switch to a nacelle frame and electrically linked by a second switch to the lightning band;
    a lightning protection conductor electrically linked with the lightning band;
    power and/or signal cables to feed the active components thereof; and
    a switching unit comprising:
        a third switch able to link at least one power and/or signal cable of the power and/or signal cables with the lightning transmission system, and
        a fourth switch able to link the power and/or signal cables with a hub frame;
    wherein each switch is able to open or close links thereof and wherein the third switch and the fourth switch are configured to be controlled in a way that during lightning activity the fourth switch is opened and the third switch is closed, deactivating the active components.

2. The smart wind turbine blade of claim 1, wherein the first switch and the second switch of the lightning transmission system are electrically linked by a sliding contact to the nacelle frame and the lightning band.

3. The smart wind turbine blade of claim 1, wherein the first switch and the second switch of the lightning transmission system are spark gaps to link with the nacelle frame and the lightning band.

4. The smart wind turbine blade of claim 1, wherein the third and fourth switches comprises air pressurized, vacuum or insulating gas/air high voltage switches.

5. The smart wind turbine blade of claim 1, wherein the third switch is a spark gap.

6. The smart wind turbine blade of claim 5, wherein the spark gap comprises an ohmic resistor connected in parallel.

7. The smart wind turbine blade of claim 1, wherein the third switch is a varistor.

8. The smart wind turbine blade of claim 1, wherein the fourth switch comprises a transformer installed in the blade root.

9. The smart wind turbine blade of claim 1, wherein the lightning protection conductor comprises a lightning protection down conductor cable used as a neutral cable for the active system, and said down conductor cable bypasses the third switch and is directly connected to the fourth switch.

* * * * *